United States Patent
Lung et al.

(10) Patent No.: US 6,751,793 B1
(45) Date of Patent: Jun. 15, 2004

(54) SYSTEM AND METHOD FOR GROWING A HIERARCHICAL STRUCTURE WITH NEW VIRTUAL BASE CLASSES WHILE PRESERVING RELEASE-TO-RELEASE BINARY COMPATIBILITY

(75) Inventors: Catherine Y. Lung, Thornhill (CA); Brian W. Thomson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,378

(22) Filed: Apr. 28, 2000

(30) Foreign Application Priority Data

Apr. 30, 1999  (CA) .............................................. 2270485

(51) Int. Cl.[7] .............................. G06F 9/44; G06F 9/00; G06F 12/00; G06F 15/00
(52) U.S. Cl. ........................ 717/162; 719/332; 707/203; 715/514
(58) Field of Search ................................. 717/100–123, 717/162–164, 128, 148, 141; 709/328, 331–332; 345/705, 763, 967; 707/103 R, 203; 714/2; 715/514

(56) References Cited

U.S. PATENT DOCUMENTS

| | | | | |
|---|---|---|---|---|
| 5,920,720 A | * | 7/1999 | Toutonghi et al. | 717/148 |
| 5,948,107 A | * | 9/1999 | Ramanathan | 714/2 |
| 5,983,020 A | * | 11/1999 | Sweeney et al. | 717/141 |
| 6,055,540 A | * | 4/2000 | Snow et al. | 707/103 R |
| 6,182,282 B1 | * | 1/2001 | Stoodley et al. | 717/116 |
| 6,275,976 B1 | * | 8/2001 | Scandura | 717/120 |
| 6,351,843 B1 | * | 2/2002 | Berkley et al. | 717/128 |
| 6,415,435 B1 | * | 7/2002 | McIntyre | 717/108 |

OTHER PUBLICATIONS

Nackman–Barton, Base–Class Composition with Multiple Derivation and Virtual Bases, Apr. 1994, Usenix C++ Technical Conference Proceedings, pp. 57–71.*

Rayside–Mamas–Hons, Compact Java Binaries for Embedded Systems, 1999, Electrical & Computer Engineering, University of Waterloo, Ontario, Canada.*

* cited by examiner

Primary Examiner—Antony Nguyen-Ba
(74) Attorney, Agent, or Firm—Scully, Scott, Murphy & Presser; Richard M. Ludwin

(57) ABSTRACT

In accordance with the method of invention, a class hierarchy is derived which maintains release-to-release binary compatibility. Leftmost classes of the class hierarchy are ordered in top down order with a most derived class at the bottom. Direct virtual classes are ordered from left to right with the leftmost class in declaration order at the top. Leftmost classes are independently grown downward and direct virtual classes are independently grown upward.

10 Claims, 15 Drawing Sheets

SYSTEM AND METHOD FOR GROWING A HIERARCHICAL STRUCTURE WITH NEW VIRTUAL BASE CLASSES WHILE PRESERVING RELEASE-TO-RELEASE BINARY COMPATIBILITY

BACKGROUND OF THE INVENTION

1. Technical Field

This invention pertains to hierarchical structures in object oriented languages. More particularly, it pertains to the growth of hierarchical structures with new virtual base classes while preserving release-to-release binary compatibility (RRBC).

2. Prior Art

Release-to-release binary compatibility (RRBC) is the ability for client code to continue to operate without recompilation, even when shared libraries upon which such code depends are updated with newer versions.

RRBC problems in the C++ programming language are introduced when information about a class is compiled into client code, such as the offset and location of class members, instance size, and the offset to parent class data. As a result, a simple change to a class, such as adding a new member or adding a new base class, may require recompilation of any derived class or client code.

There is a requirement for class libraries to allow adding new base classes in a class hierarchy without impacting RRBC. There is also a requirement to allow adding a new virtual base only on the non-leftmost path of a class hierarchy without impacting RRBC and the performance of single or leftmost path inheritance. There is also a requirement to minimize the cost to performance ratio in any solution to these requirements.

From the experience of class library designers, a class hierarchy can never be right in the first couple of releases without extensive use by its customers. Changes to class hierarchies are likely to happen in subsequent releases, especially when adding new bases. In the current design of most class libraries, use of non-virtual and single inheritance is far more common than virtual and multiple inheritance. The performance of virtual and multiple inheritance discourages class designers from using it. So to them, allowing the addition of non-virtual base classes in single inheritance without impacting RRBC is required and they need to be able to add the new classes at the end or in the middle of the hierarchy. To satisfy this requirement from designers of class libraries is possible but comes with a performance penalty.

Accessing Data in a Non-virtual Base Class

Current inheritance implementations, such as the IBM®VisualAge® and Taligent C++, forego all indirection, except for accessing a virtual base; that is, the data members of a base class subobject are directly stored within the derived class object. Access of a data member requires the addition of the beginning address of the class object with the offset location of the data member.

The offset is known at compile time even if the member belongs to a base class subobject derived through a single or multiple inheritance chain. This offers the most compact and most efficient access of non-virtual base class members.

TABLE 1

IBM and Taligent use direct data access in non virtual inheritance:

```
//* (obj+member_offset)=value
move [this+member_offset],value
    //direct assign "value" to data member
```

In Table 1, the move statement moves a "value" to the address of a data member in a base class. The address of the data member is obtained by addition of the "this" pointer which points to the beginning of the object to the offset of the member within the object. "obj" and "this" are here used interchangeably, and refer to the beginning address of an object. [this+member_offset] refers to the address of the data member.

Accessing Data in a Virtual Base Class:

Currently, IBM VisualAge C++ access to a virtual base class subobject is done through a virtual base pointer located inside the class object. The location of the virtual base pointer is fixed and known during compile time so an extra level of indirection is required to access data in the virtual base.

Instead of using virtual base pointer, currently Taligent C++ access to a virtual base class subobject is done through a virtual function table VFT pointer. If a given class directly or indirectly inherits from a virtual base class, the VFT (also referred to as vtable) of that given class contains offsets to find the virtual base subobjects. Use of virtual base offsets results in more instructions to do virtual base accesses, but smaller object size or less initialization time is needed during the program startup time.

TABLE 2

IBM VisualAge C++ data access in virtual inheritance : 1 extra memory access compared to direct access in non-virtual case

```
//* (this+*this-->vbp+member_offset)=value
move    eax,[this+virtual_base_pointer_offset]
            //eax=virtual base pointer
move    [eax+member_offset_within_base], value
            //indirect assign "value" to //virtual base's data member
```

In Table 2, the first move statement moves the virtual base pointer (vbp) to register eax. The location of the vbp is obtained by addition of the "this" pointer to the offset of the virtual base pointer within the object. The next move statement moves a "value" to the member of the virtual base. The address of the data member is obtained by addition of the vbp to the offset of the member within the virtual base class. The first move statement denotes the extra memory access which is not required in the non-virtual case.

TABLE 3

Taligent C++ data access in virtual inheritance: 2 extra memory accesses compared to direct access in non-virtual case

```
//* (this+this>vft{vbaseoffset_index}+member_offset)=value
move    eax,[this]
            //eax=virtual function table address
move    eax,vbase_index[eax]
            //eax=virtual base class offset
add     eax, this
            //eax=this+virtual base offset
```

TABLE 3-continued

Taligent C++ data access in virtual
inheritance: 2 extra memory accesses compared to direct
access in non-virtual case

| move | [eax+member_offset_within_base],value |
| | //indirect assign "value" to |
| | // virtual base's data member |

In Table 3, the first move statement moves the virtual function table (VFT) address to register eax. This is the first extra memory access. The VFT address is stored in the memory pointed to by the "this" pointer. The second move statement moves the offset of the virtual base to register eax from an index to the VFT. This is the second extra memory access. The add statement gets the address of the virtual base class in register eax by adding the "this" pointer to the offset of the virtual base within the object. The last move statement moves the value to the data member address. The data member address is obtained by adding the member offset to the address of the virtual base.

Supporting Addition of New Bases:

To support adding new base classes, both virtual and non-virtual, the offset locations of the base within the object are no longer fixed and known during compile time. One way to solve the problem is to introduce a base class table to keep track of the offset or address of an associated base class and use an extra level of indirection to access base class members. This is similar to accessing a virtual base but the table has to be completed at run-time to achieve RRBC.

TABLE 4

Data access using run-time base offset table in
virtual and non-virtual inheritance: 2 extra
memory access compare to direct data access

| //* (this+base_table[base_index]+member_offset)=value | |
| move | eax,[base_table] |
| | //eax=address of base offset table |
| move | eax,base_index[eax] |
| | //eax=base class offset |
| add | eax,this |
| move | [eax+member_offset],value |
| | //assign "value" to base's data member |

In Table 4, the first move statement is the first extra memory load and the second move statement is the second extra memory load. In the normal case, both IBM VisualAge and Taligent C++ do not require any memory load in accessing a data member in a non-virtual base.

Thus, in accessing data in a virtual or non-virtual base, two extra memory loads are required compared to direct data access. Since the majority of time spent in executing most applications is spent on accessing data, extra memory loads slow down the program significantly.

Calling a Virtual Function in a Base Class

The IBM VisualAge C++ compiler currently uses a general virtual function implementation model. That is, the virtual function is invoked through the virtual function table where the address of the function is stored. This is illustrated in Table 5.

TABLE 5

IBM virtual function call in non-virtual base:
1 memory access

| //baseThis=this+base_offset | |
| //function address=baseThis—>vtp[index] | |
| | //enter with eax="this"pointer |
| add | eax,base_offset |
| | //eax=address of baseThis |
| move | ecx,[eax] |
| | //ecx=address of base's vtable |
| jump | func_index[ecx] |
| | //go to desired function/adjustor thunk |

An "adjustor thunk" is a small piece of code which is used to calculate the address of a calling virtual function.

Currently, the Taligent C++ implementation for calling virtual functions uses a class segment table in the VFT to introduce an extra level of indirection. This is illustrated in Table 6, illustrating a procedure which allows addition of virtual functions without recompiling client code.

TABLE 6

Taligent C++ virtual function call in a non-
virtual base: 1 extra memory access compared with IBM
VisualAge C++ model

| //baseThis=this+base_offset | |
| //function | |
| address=*(*baseThis→vtp[class_index]+func_index | |
| | //enter with eax="this"pointer |
| add | eax,base_offset |
| | //eax=address of baseThis |
| move | eax,[eax] |
| | //eax=address of base's vtable |
| move | eax,class_index[eax] |
| | //eax=address of base's vtable |
| jump | func_index[eax] |
| | //go to desired function / adjustor thunk |

In Table 6, the second move statement is the extra memory access.

TABLE 7

Taligent C++ virtual function call in a virtual
base: 2 extra memory accesses compared with IBM VisualAge
C++ model

| //baseThis_=this+this→vtp[vbase_index] | |
| //function address=* (baseThis→vtp[class_index]+func_index | |
| move | eax,[eax] |
| | //eax=address of most derived class' vtable |
| move | eax,vbase_index[eax] |
| | //eax=virtual base offset |
| add | eax,this |
| | //eax=virtual base's "this" pointer |
| move | ecx,[eax] |
| | //ecx=address of vbase's vtable |
| move | ecx,class_segment_index[ecx] |
| | //ecx=address of vtable slots for |
| | //function's class |
| jmp | func_index[ecx] |
| | //go to desired function/adjustor thunk |

The example of Table 7 illustrates how the address of a virtual function of a virtual base class is obtained from a derived class. The first move statement moves the content of the "this" pointer which is the address of the derived class's VFT to register eax. This move statement is the first extra memory access. Inside the VFT of the derived class, an array of virtual base offsets is found. The second move statement moves a virtual base offset from an index to the VFT to register eax. The add statement adds the "this" pointer to the virtual base offset in eax and stores the result back to eax which now contains a pointer to the virtual base. The next move statement moves the content of the virtual base pointer which is the address of the VFT of the virtual base class to register ecx. Inside the VFT of the virtual base class, a class segment table is found. Each entry of the class segment table contains a pointer to a virtual functions table that the class introduces. The last move statement moves the address of the virtual functions table in register ecx by indexing to the class_segment table. This last move statement is the second extra memory access. The index to the virtual functions table is the address of the virtual function which the jump statement uses to transfer to the virtual function.

When extending the Taligent C++ model to support adding new base classes, the index of a class inside the class segment table is no longer known during compile time so another level of indirection is needed. Similar to supporting data access, a base table may be employed, which is completed during the runtime, to keep track of the class index inside the class segment table and the base offset.

TABLE 8

Adding an extra level of indirection to non-virtual inheritance:3 extra memory accesses compared with the IBM VisualAge C++ model and 2 extra memory accesses compared with the Taligent C++model

```
//class_index=base_table[base_index]—>class_index_in_vtt
//baseThis=this+base_table[base_index]—>base_offset
//function
address=*(*baseThis→vtp[class_index]+func_index)
            //enter with eax = "this"pointer
move    ecx,[base→table]
            //ecx=address of base table
move    ecx,base_index[ecx]
            //ecx=base offset
add     eax,ecx
            //ecx=base offset
move    ecx,class_index[ecx]
            //ecx=class offset in the VFT
add     ecx,[eax]
            //ecx=cls_seg_index of vtable
            //slots for function's class
move    ecx,[ecx]
            //ecx=address of vtable slots for
            //function's class
jmp     func_index[ecx]
            //go to desired function/adjustor thunk
```

In Table 8, the first move statement moves the address of the base table to ecx. The second move statement moves the base offset from an index to the base table to ecx. The base pointer is obtained by adding the base offset to the "this" pointer. The third move statement moves the virtual functions list address from an index to the class segment table in register eax and this is the second extra memory access. The index to the virtual functions list is the address of the virtual function which the jump statement uses to transfer to the virtual function.

Compiler support for multiple and virtual inheritance is expensive. Multiple inheritance is neither as well behaved nor as easily modeled as single inheritance. And the complexity is in the "unnatural" relationship of a derived class with its second and subsequent base class subobjects. The problem and cost of multiple inheritance primarily comes from conversions between the derived and second or subsequent base class objects and "this" pointer adjustments when a function member is called.

For virtual inheritance, current C++ implementations insert a pointer to each virtual base class within each derived class object. Access of the inherited virtual base class members is achieved indirectly though an associated pointer. With this implementation, space and access-time overhead is added when accessing data in a virtual base.

These reasons contribute to why virtual and multiple inheritance are avoided by class library designers if they can. They only pay the price if they use it.

Taligent's C++ VFT of the most derived class contains offsets of all direct and indirect virtual bases so no extra indirection is needed to do virtual base access as the virtual inheritance chain lengthens. This is the same as in the IBM VisualAge C++, which has virtual base pointers of direct and indirect virtual bases embedded in the object such that no extra indirection is needed. However, both the IBM VisualAge C++ and Taligent C++ models do not have the ability to add new virtual bases without impacting RRBC.

The size of the VFTs in different current implementations, is as follows:

IBM VisualAge C++ VFT:
RTTI entries+virtual function slots
Taligent C++ RRBC VFT:
(number of direct and indirect virtual bases+number of classes that have virtual functions on leftmost path)+
RTTI entries+virtual function slots
where RTTI refers to runtime type identification.

Unlike the Taligent C++, IBM's VisualAge C++ VFT doesn't contain any information for virtual base access so the size of IBM's VFT is smaller. Virtual base access is done through virtual base pointers embedded in the object so the size of an IBM object will be bigger than objects in the Taligent model.

The overhead currently required, as noted above, in supporting the addition of new base classes is not within acceptable levels, and there is a need in the art for a solution.

SUMMARY OF THE INVENTION

In accordance with the method of invention, a class hierarchy is derived which maintains release-to-release binary compatibility. Leftmost classes of the class hierarchy are ordered in top down order with a most derived class at the bottom. Direct virtual classes are ordered from left to right with the leftmost class in declaration order at the top. Leftmost classes are independently grown downward and direct virtual classes are independently grown upward.

In accordance with the system of the invention, a virtual function table is provided for independently growing leftmost classes and direct virtual classes in a class hierarchy while maintaining release-to-release binary compatibility.

Other features and advantages of this invention will become apparent from the following detailed description of the presently preferred embodiment of the invention, taken in conjunction with the accompanying drawings.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

When referring to an object oriented language, and to a hierarchy of files in an object oriented application, the following definitions and descriptions are used.

Figure 1:
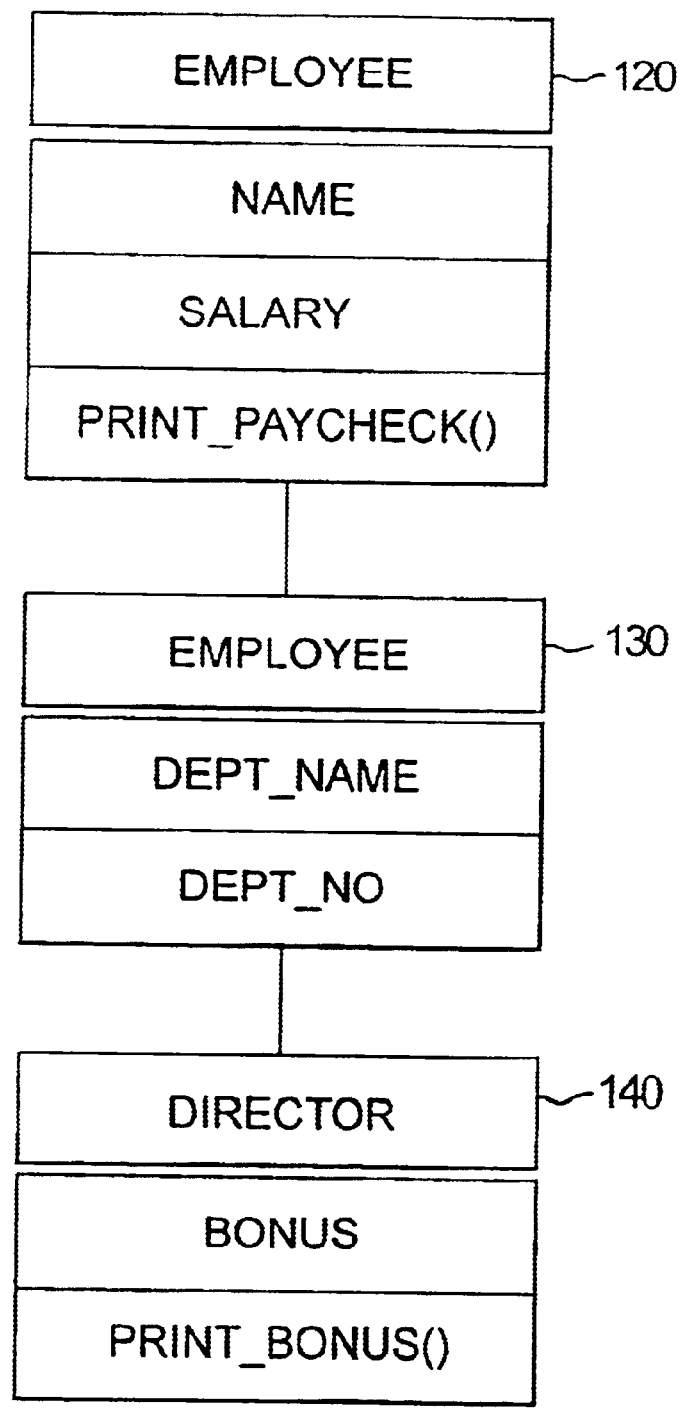
FIG. 1 illustrates object oriented language abstract data types in an inheritance chain.

Referring to FIG. 1, in object oriented (OO) languages, a class is used to implement an abstract data type containing all functions and data appropriate for the type. Employee 120, manager 130, and director 140 are abstract data types, illustrated in an inheritance chain.

A member is used to represent a property or an operation of a class. Employee 120 has salary 120a and name 120b as data members and print_paycheck( ) 120c as a function member.

A data member is a value which is stored directly with a class object. It is used to represent the state of an object at a given time. Manager 130 has two data members dept_name 130a and dept_no 130b.

Figure 2:
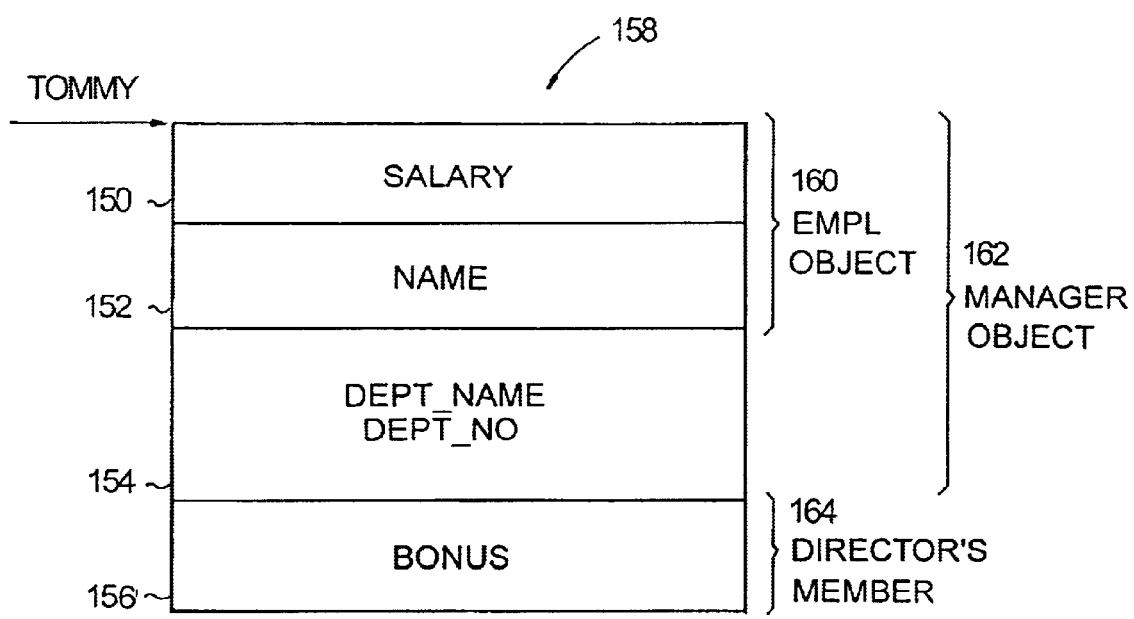
FIG. 2 illustrates a base class subobject.

Referring to FIG. 2, a class object is a region of storage that represents an instance of a given type. Objects of derived classes are composed by concatenating the members 150, 152, 154 of the base classes and members 156 of the derived class itself. Tommy 158 is an instance of derived class director 140. A base class subobject is a region of storage that represents a base class of an instance. Instance director Tommy 158 has employee 160 and manager object 162 as base class subobjects.

Single inheritance refers to a class which is derived from one and only one base class. Director 140 is single inherited from manager 130, and manager 130 is single inherited from employee 120.

Figure 3:
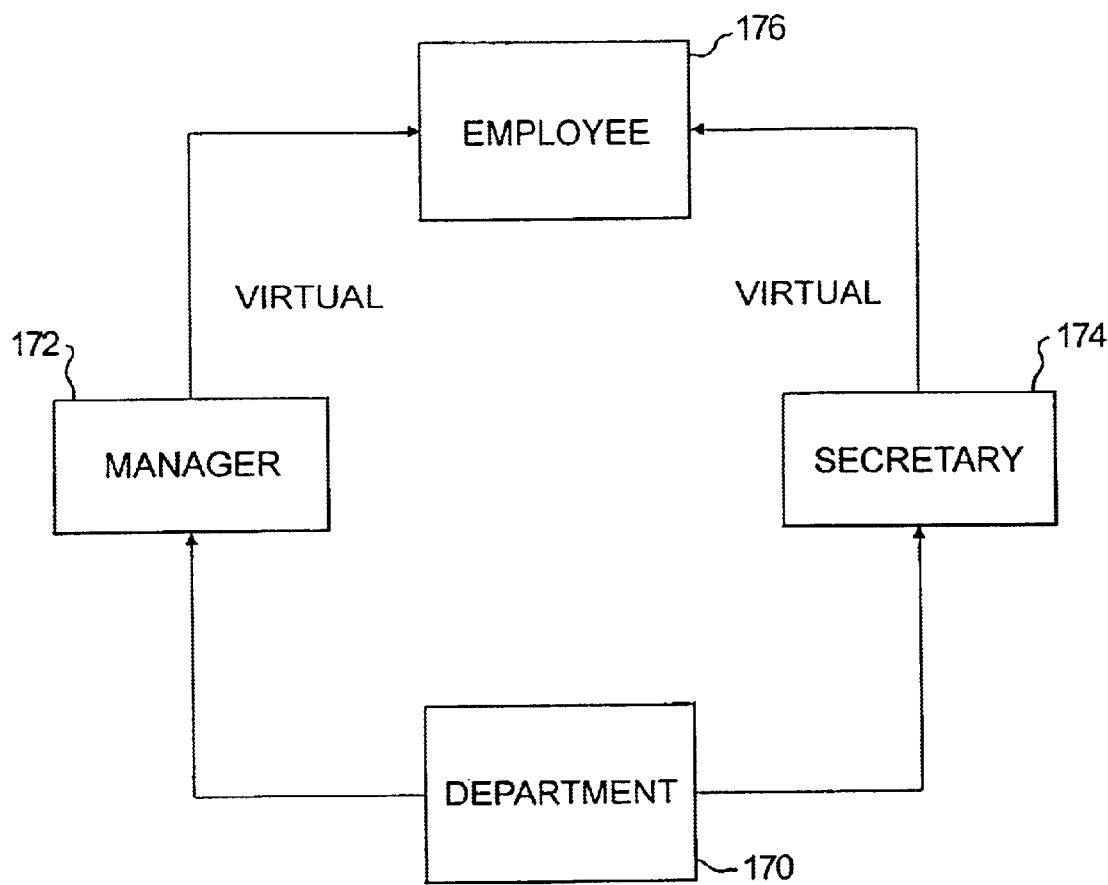
FIG. 3 illustrates multiple inheritance.

Referring to FIG. 3, multiple inheritance refers to a class which is derived from more than one base class. Derived class department 170 is multiple inherited from base classes manager 172 and secretary 174. An inheritance chain is a graph which shows the connectivity of a derived class and its base classes. FIG. 3 illustrates the inheritance chain for derived class department 170. Rightmost position refers to the rightmost base class of a derived class in declaration order. Secretary 174 is in the rightmost position of base classes 172, 174 of department 170. Leftmost position refers to the leftmost base class of a derived class in declaration order. Manager 172 is the leftmost position of the base classes 172, 174 of department 170. Leftmost path inheritance is the leftmost path in the inheritance chain of a derived class. Employee 176, manager 172, department 170 forms the leftmost path in the inheritance chain for a class department 170.

A virtual base class is a base class having a given name that is specified to be virtual. A virtual base class is represented by a single object or instance of that class. One single copy of employee object 176 is shared between manager 172 and secretary 174 since it is specified with virtual inheritance.

Figure 4:
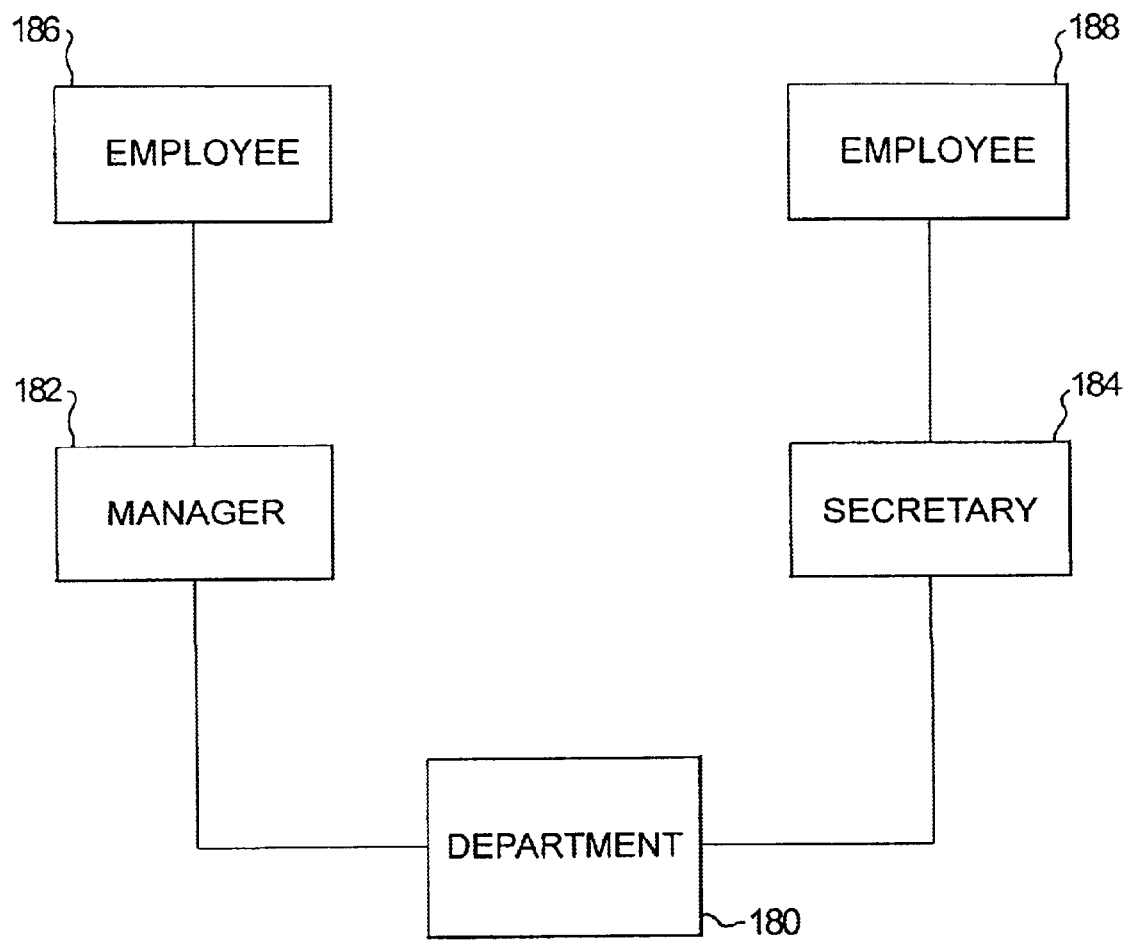
FIG. 4 illustrates a non-virtual base class.

Referring to FIG. 4, a non-virtual base class is a base class with a given name that is not specified to be virtual. A non-virtual base class will have its own object representing it. Each of manager 182 and secretary 184 has its own copy of employee object 186, 188, respectively, since it is not specified with virtual inheritance.

Figure 5:
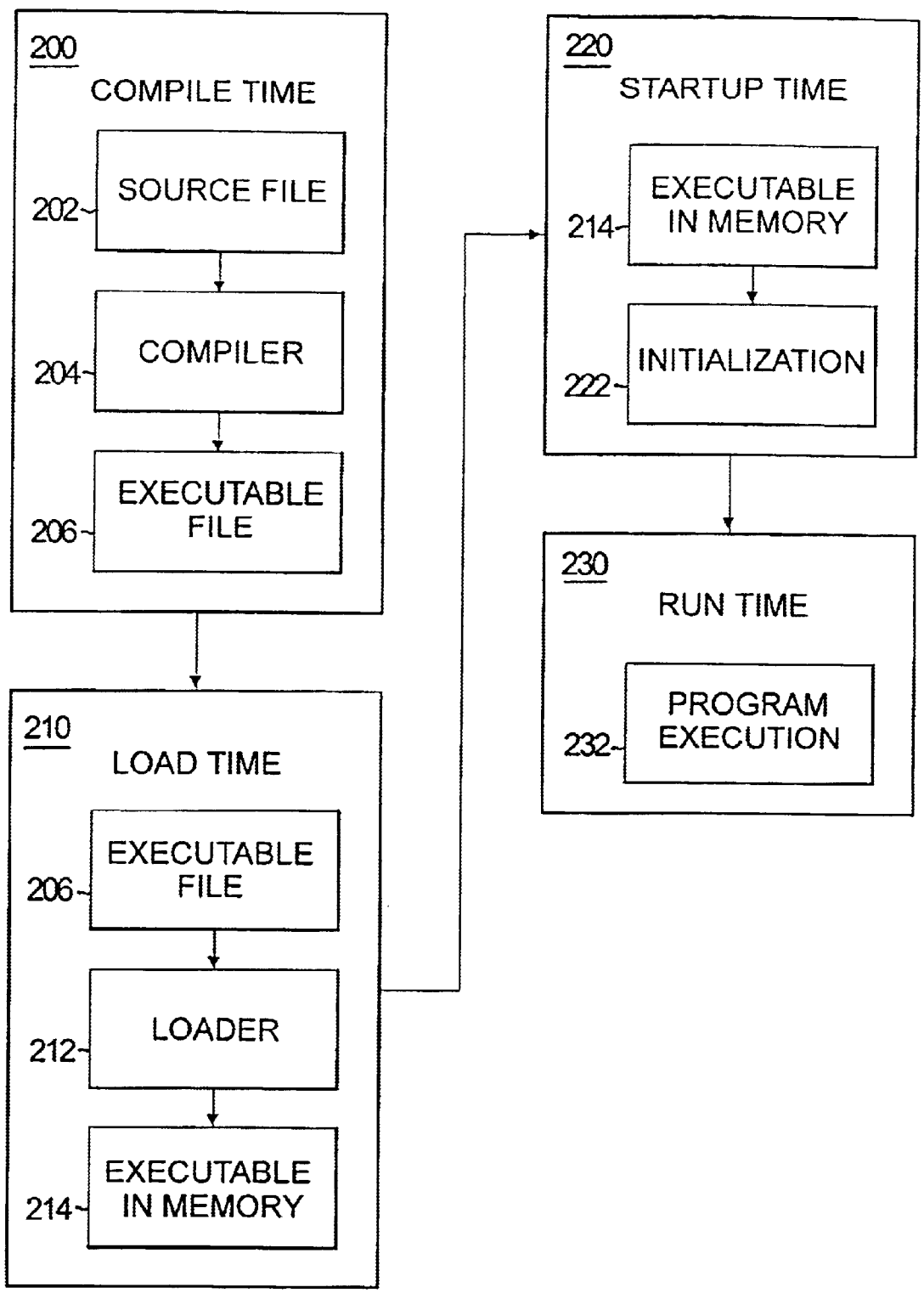
FIG. 5 illustrates compile time, load time, startup time and run time processing.

Referring to FIG. 5, during compilation process 200, source code 202 containing class definitions is processed by compiler 204. Class interfaces, implementations and object layouts are resolved. Offsets to the members inside an object and the index to the VFT are statically bound to produce executable code 206.

During load process 210, before executable 206 starts running, loader 212 loads executable file 206 in memory to produce executable in memory 214. During load time 200, addresses of data objects and VFTs are resolved.

Once the executable 214 is loaded, during startup time 220, initialization routines 222 are run to make sure all objects are properly constructed and initialized.

During run time 230, the resulting program is executed and operations 232 are done on the objects. Once the objects are done, they are destroyed properly before program execution 232 terminates.

In tables throughout this specification, general low level assembly code (MOVE, ADD . . . ) is used to show the instructions for executing a C++ statement. The comment in the first line(s) of each code example is the corresponding CC+ statement. The assembly code syntax is as follows.

| MOVE | DEST, SRC // move from SRC to DEST |
| ADD  | DEST, SRC // add DEST and SRC and assign the result to DEST | where DEST represents the destination operand and SRC represents the source operands. Operands can be registers (eax, ecx . . . ), immediate values (value) or memory addresses. Memory addresses can be direct or indirect. Indirect addressing is represented by putting square brackets around the operand, e.g. [SRC], which means SRC contains the address of the operand. If the operand is in memory, it can be specified whether a displacement or an index register is to be used. If displacement is used, the syntax will look like 'memory+displacement'. If an index register is used, the syntax will look like 'index[array]' which refers to the index of the member of 'array'.

JMP DEST // jump to the DEST where DEST is the memory address where the JMP statement jumps to.

The C++ syntax used in these code examples is as follows:

| "this" | refers to a pointer which points to an object for which the member function is invoked. |
| this—>member | syntax to access a data or member function through a pointer. |

| | |
|---|---|
| *obj | refers to a pointer to an object and it is interchangeable with "this" pointer. |
| *(obj+member_offset) | refers to a pointer to the member of an object where member_offset is the offset is the offset to the member from the beginning of an object. |
| table[n] | refers to the nth member of table where table is an array of a given type. |

Figure 6:
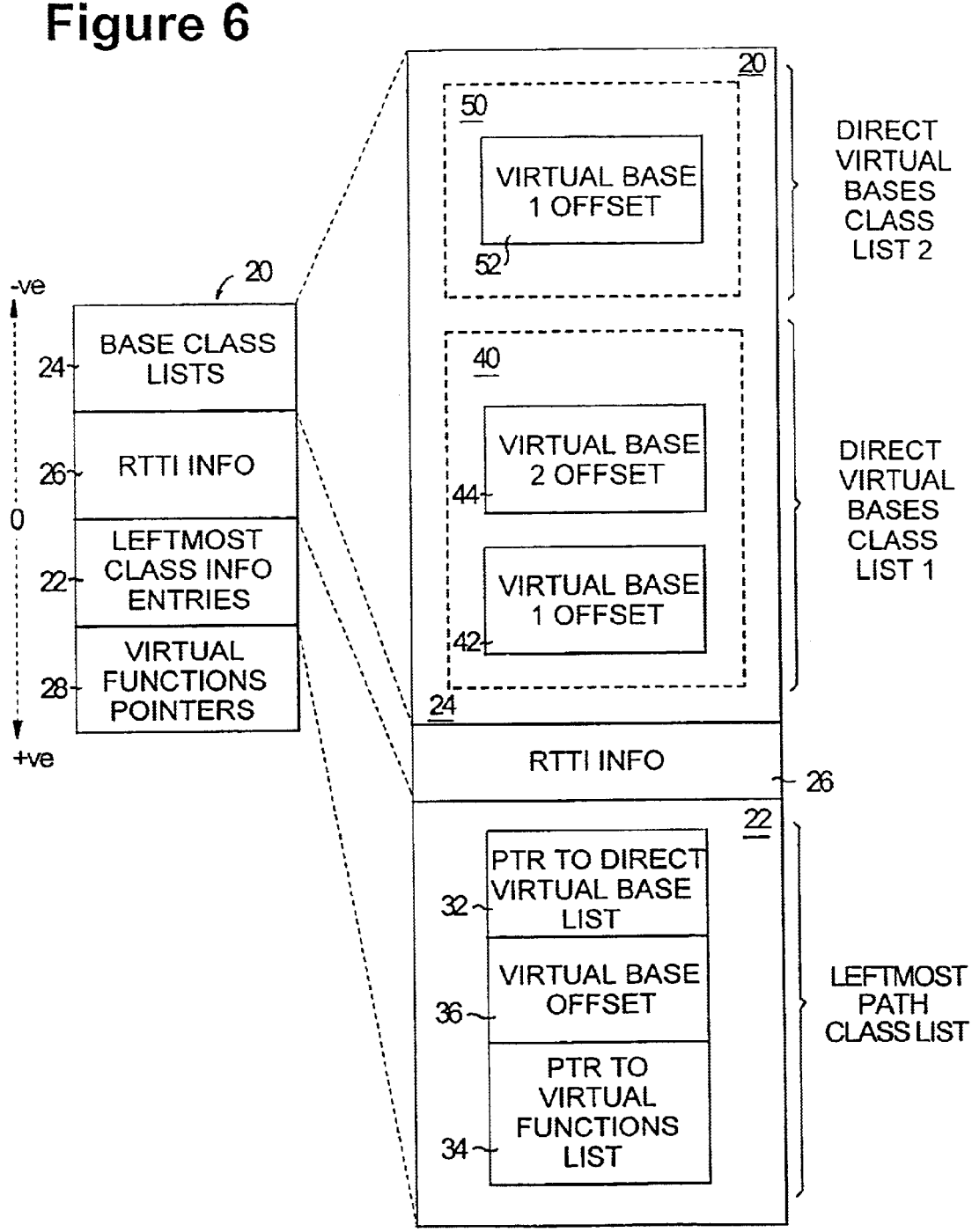
FIG. 6 illustrates a virtual function table (VFT) in accordance with the preferred embodiment of the invention.

Referring to FIG. 6, in accordance with the preferred embodiment of the invention, new virtual base classes are added on the rightmost position of a class hierarchy in an object oriented application by decomposing the class hierarchy into link lists, including a leftmost path class list and direct virtual base list; and providing a virtual function table (VFT) 20 including a virtual base class lists section 24, a runtime type identification (RTTI) information section 26, a leftmost path classes information section 22, and a virtual function pointers section 28.

Leftmost Path Class List

To allow further derivation in a class hierarchy in future releases and preserve the performance of single and leftmost path inheritance, classes on the leftmost path are ordered in a way that the order will not be changed from release to release and the list will have room to expand. To achieve this, all leftmost classes of a class hierarchy are ordered in top down order with the topmost class appearing on the top of the list and the most derived class appearing at the bottom. When a new derived class is added, it is placed at the bottom of the list without altering the order of the other classes in the list. The list grows downward.

Direct Virtual Base List

To allow new virtual base classes to be added to a hierarchy without impacting RRBC, a pointer is employed to keep track of a list, the direct virtual base list, belonging to a particular class in the hierarchy and to let that direct virtual base list grow independently from the leftmost path class list. Bases in the direct virtual base list are ordered from left to right with the leftmost base appearing at the bottom and the rightmost base appearing on top. New bases can only be added on the rightmost position, and the direct virtual base list grows upward.

To implement the leftmost path class list and direct virtual base list in a C++ compiler, virtual function table (VFT) 20 is structured to include the following four main sections.

Virtual Base Class Lists Section 24

The virtual base class lists section 24 is used for virtual base class access. Each class list 40, 50 comprises the second and subsequent direct virtual bases of an object in left to right order, and is accessed through a pointer 32 of its derived class from the leftmost path classes information section 22. Each entry in the list comprises the virtual base offset 42, 44, or 52.

Runtime Type Identification (RTTI) Section 26

The RTTI section 26 comprises information for runtime type identification (RTTI) support.

Leftmost Path Classes Information Section 22

The leftmost path classes information section 22 is used for leftmost path or single inheritance class access. Classes on the leftmost path are ordered in top-down order. Each entry in this section is a class information entry structure comprising the following fields:

pointer 32 to the list 20 of a class's direct virtual bases, or NULL;

pointer 34 to the first virtual function pointer if the class has virtual functions; and virtual base offset 36 if the entry represents a virtual base.

Virtual Function Pointers Section 28

Virtual function pointers section 28 is used for virtual function dispatch. Each pointer holds either the address of a virtual function of the class, or the address of an adjustor thunk (small piece of code which is used to calculate the address of a calling virtual function). The function pointers are grouped so that the entries for all virtual functions introduced by a base class are kept together.

To access a data member of direct virtual base on the leftmost path, two indirections are traversed. To invoke a virtual function, four indirections are traversed. As the virtual inheritance chain, or path, lengthens, the level of indirection increases.

In accordance with the preferred embodiment of the invention, base classes may be added to a hierarchy without substantially affecting the presently achieved performance of accessing members in non-virtual and single inheritance cases.

In accordance with one embodiment of the invention, new virtual base classes may be added only as non-leftmost bases, and thus provide non-virtual base access without degradation, provide for further derivation of the hierarchy without impacting RRBC, and provide single inheritance and leftmost path access without degradation.

Figure 7:
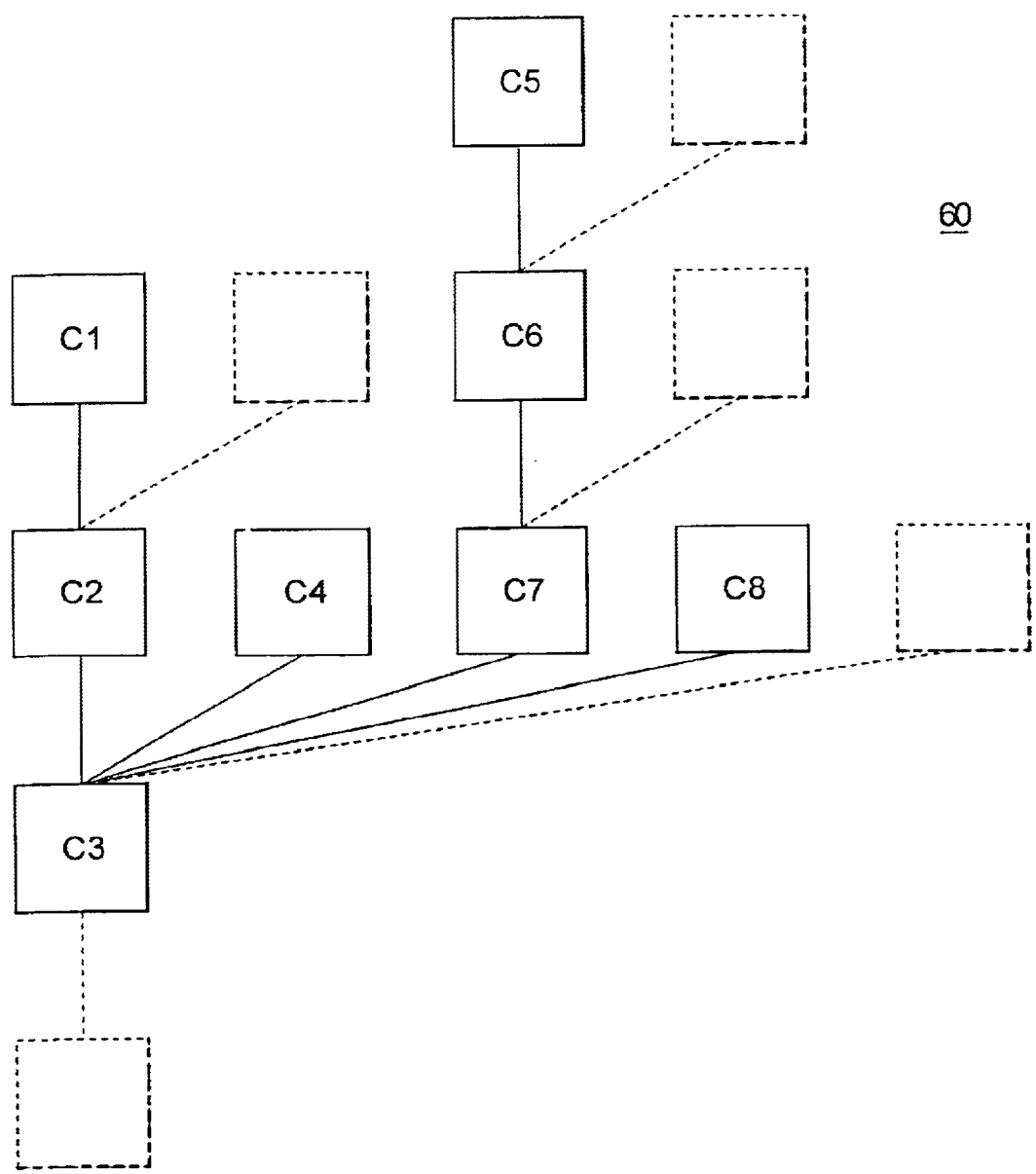
FIG. 7 illustrates a class hierarchy.
Figure 8:
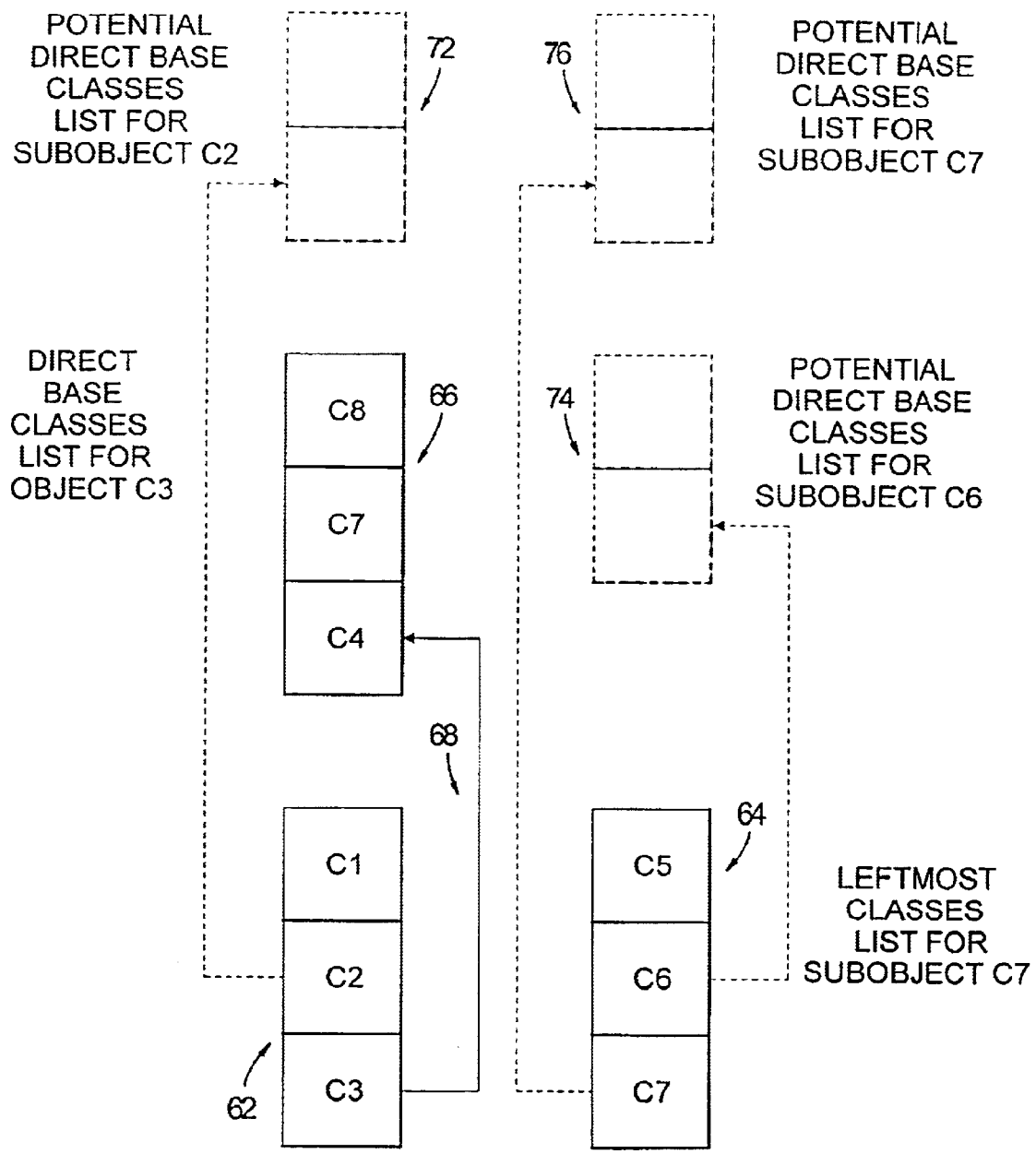
FIG. 8 illustrates the class hierarchy of FIG. 7 when decompose into linked lists.

Referring to FIGS. 7 and 8, a class hierarchy 60 is illustrated, including classes C1 through C8. The dotted squares C9–C13 of FIG. 7 represent places where new classes can be added in subsequent releases.

Referring to FIG. 8, the class hierarchy of FIG. 7 is decomposed into linked lists 62, 64, and 66. Leftmost path class lists 62 and 64 comprise all the classes on leftmost path of the object or subobject, including classes C3-C2-C1, and C7-C6-C5 (these latter classes being the leftmost classes of subobject C7). Direct virtual base list 66 comprises all direct virtual base classes of an object or subobject: C4-C7-C8 (which, in this case, are direct bases of object C3).

To allow further derivation in the class hierarchy 60 in future releases and preserve the performance of singe and leftmost path inheritance, classes on leftmost paths 62,64 must be ordered in a way that the order will not be changed from release-to-release and the list will have room to expand. As illustrated in FIG. 8, all leftmost classes 62,64 are ordered in top down order with the topmost class C1,C5, respectively, appearing on the top of the list and the most derived class C3,C7, respectively, appearing at the bottom. When a new derived class is added to a leftmost classes list 62 or 64, it will be placed at the bottom of the list without altering the order of the other classes in the list. Lists 62,64 grow downwards.

To allow the leftmost path class list 62 to grow and a new base class to be added, a pointer 68 is employed to keep track of a list 66 of the direct bases C8-C7-C4 belonging to a particular class in the hierarchy and let it grow separately. The bases C8-C7-C4 in the list 66 are ordered from left to right with the leftmost base C4 appearing at the bottom and the rightmost base C8 appearing on top. New bases can only be added on the rightmost position C8. List 66 grows upward.

Subobjects C2, C6 and C7 have potential to have direct base class lists 72,74,76, respectively, added in future releases. To reach base class list 76 of subobject C7, leftmost path list 64 of subobject C7 must be accessed.

Referring further FIG. 6, VFT 20 is structured in accordance with the preferred embodiment of the invention, to support adding new base classes. VFT 20 includes virtual base class list section 24, RTTI information section 26, leftmost path class information section 22, and virtual function pointers section 28.

1. Virtual base class lists section 24 is used for virtual base class access. Each list 40, 50 comprises the second and subsequent direct virtual bases of an object in the leftmost path in left-to-right order. Each entry 42,44, for example, in list 40 comprises the virtual base offset.

2. RTTI info section 26 comprises information for runtime type identification support.

3. Leftmost path classes information section 22 is used for leftmost path or single inheritance class access. Classes on the leftmost path are ordered in top-down order. Each entry in this section is a class info entry that is a structure comprising the following fields:

pointer 32 to the list of its direct bases, or NULL pointer 34 to the first virtual function pointer if the class has virtual functions virtual base offset 36 is the entry represents a virtual base In accordance with the preferred embodiment of the invention, in order to maintain the performance of non-virtual base access, no extra indirection is introduced to access data in non-virtual bases. The non-virtual base offset must be fixed and known at compile time so there is no need to keep the non-virtual base offset in VFT structure 20. Thus, no new non-virtual bases are added in future releases (without requiring recompilation).

Classes added to lists 72,74, and 76 must be virtual.

4. Virtual function pointers section 28 includes pointers that are used for virtual function dispatch. Each pointer holds either the address of a virtual function of the class, or the address of an adjustor thunk. The function pointers are grouped in section 28 so that the entries for all virtual functions introduced by a base class are kept together.

In accordance with the preferred embodiment of the invention, no extra costs occur on data access provided the class being accessed appears in the leftmost path of a hierarchy, appears in single inheritance, and is a non-virtual base.

TABLE 9

Access of data in virtual inheritance on a non-leftmost path: 3 memory accesses

```
//* (this+this_
 →vft[class_index]+base_index)+member_offset)=value
move     ecx,[this]
             //ecx=address of vtable
move     ecx,class_index[ecx]
             //ecx=class'vbase list address
move     ecx,base_index[ecx]
             //ecx=virtual base offset
add      ecx,this
             //ecx=address of the virtual base
move     [ecx+member_offset],value
             //assign "value" to the offset of
             //data member within the virtual base
```

In Table 9, the first move statement moves the content of the "this" pointer which is the address of the VFT to ecx. This is the first memory access. The second move statement moves the address of the virtual base class list to ecx from an index of the VFT. This is the second memory access. The third move statement moves the virtual base offset from an index to the virtual base class list to ecx. This is the third memory access. The address of the virtual base is obtained by adding the "this" pointer to the virtual base offset. The last move statement moves a value to a virtual base member by adding the member offset to the beginning address of the virtual base.

Further in accordance with the preferred embodiment of the invention, there is no extra cost in calling a virtual function if the class appears in the leftmost path of a hierarchy and appears in single inheritance.

TABLE 10

Calling virtual function in virtual inheritance on non-leftmost path: 5 memory accesses

```
//baseThis=this+*(*this—>vft[class_index]+base_index)
//function address=*(*baseThis→vft[class_index]+func_index)
             //enter eax with "this"
move     eax,[eax]
             //eax=address of vtable
move     eax,class_index[eax]
             //eax=address of the base class list
move     eax,base_index[eax]
             //eax=virtual base offset
add      eax,this
             //eax=baseThis
move     ecx,[eax]
             //ecx=address of virtual base's vtable
move     ecx,class_index[ecx]
             //ecx=address of the vtable slots
             //for class's functions
jmp      func_index[ecx]
             //go to desired function/adjustor thunk
```

In Table 10, the first move statement moves the content of the "this" pointer which is the address of the VFT to register eax. This is the first memory access. The second move statement moves the address of the base class list to register eax from an index to the VFT to register eax. This is the second memory access. The third movement moves the virtual base offset from an index to the base class list in the VFT to register eax. This is the third memory access. The address to the virtual base will then be obtained by adding the "this" pointer to eax, the virtual base offset. The fourth move statement moves the content of the "this" pointer of the virtual base to ecx which is the address of the VFT of the virtual base to ecx. This is the fourth memory access. The last move statement moves the address of the virtual functions list to ecx by indexing to the class segment section in the VFT. This is the fifth memory access. The index to the virtual functions list is the address of the virtual function which the jump statement uses to transfer to the virtual function.

Tables 11 and 12 compare the number of memory accesses used in data access for virtual function calls in IBM VisualAge C++, in the prefered embodiment of the invention and in the IBM VisualAge C++ product extended with the preferred embodiment of the invention. The IBM VisualAge C++ implementation doesn't have RRBC capacity. The preferred embodiment of the invention provide RRBC capability and the addition of the new virtual base classes. Table 11 illustrates single inheritance and leftmost path access. Table 12 illustrates multiple inheritance and non-leftmost path access.

TABLE 11

Single Inheritance and Leftmost Path Access (Memory Accesses)

| | IBM VisualAge C++ | Preferred Embodiment | Support Adding New Bases, Virtual and Non-Virtual Using Indirection |
|---|---|---|---|
| Data Access in Non-virtual Inheritance | 0 | 0 | 2 |
| Data Access in Virtual Inheritance | 1 | 2 | 2 |
| Virtual Function Call on Non-Virtual Base | 1 | 2 | 4 |
| Virtual Function Call in Virtual Base | 2 | 4 | 4 |

TABLE 12

Multiple Inheritance and Non-leftmost Path Access (Memory Accesses)

| | IBM VisualAge C++ | Preferred Embodiment |
|---|---|---|
| Data Access in Non-virtual Inheritance | 0 | 0 |
| Data Access in Virtual Inheritance | 1 | 2+level of virtual inheritance |
| Virtual Function Call on Non-Virtual Base | 1 | 2 |
| Virtual Function Call in Virtual Base | 2 | 4+level of virtual inheritance |

In the preferred embodiment of the invention, as the virtual inheritance chain lengthens, the level of indirection increases as the virtual inheritance increases to that depth (the number of levels of base classes in the hierarchy chain).

In accordance with the preferred embodiment of the invention, the size of the VFT is as follows:

(no. of direct virtual bases+no. of classes on leftmost path+no. of classes that have virtual function on leftmost path)+RTTI entries+virtual function slots Compared to Taligent's C++ VFT, the VFT 20 of the preferred embodiment of the invention will be bigger if the hierarchy has deep single inheritance or deep leftmost path length. Taligent's VFT will be bigger if there is more indirect virtual bases in the hierarchy.

With respect to program startup time, since values in the VFT representing virtual base object offset, object size, and virtual functions are not known until runtime, the VFT cannot be initialized statically. Partially initialized virtual function tables are provided, together with data structures that allow the runtime to complete them by copying entries from base class tables derived from class tables. This is done in the startup time before any instance of the class is allocated.

Figure 9:
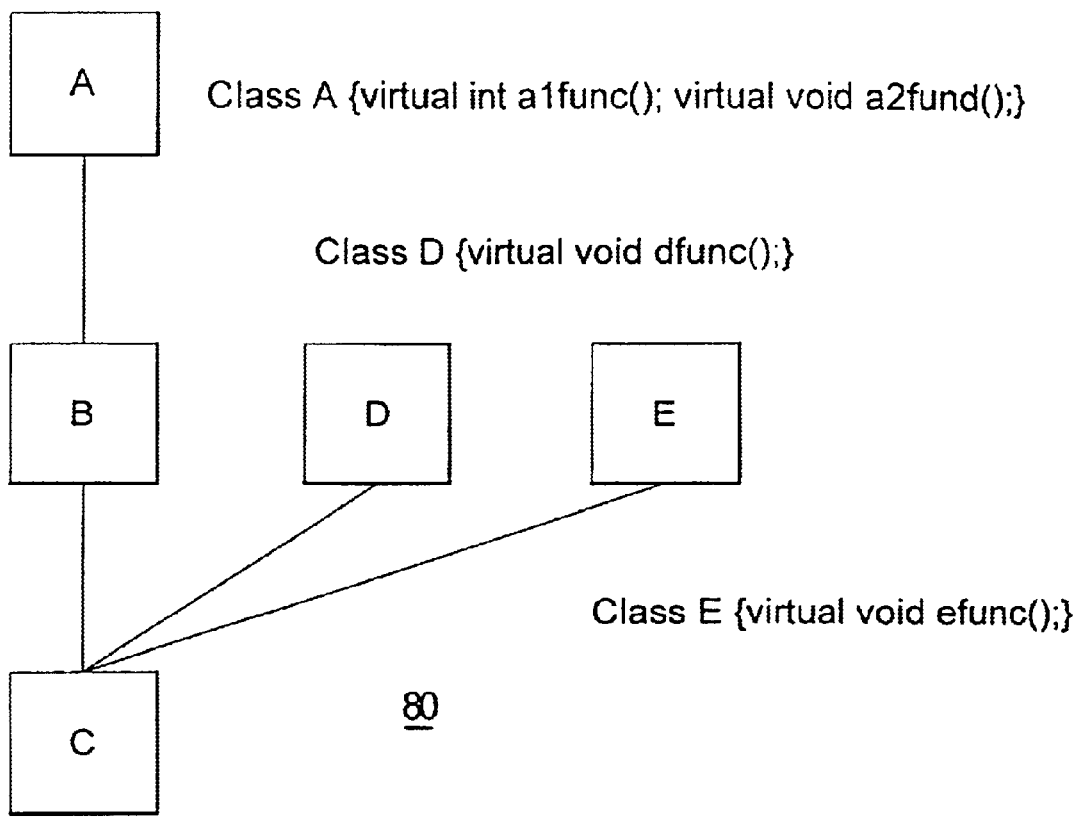
FIG. 9 illustrates a class hierarchy, together with the C++ statements creating it.

Referring to FIG. 9, consider class hierarchy 80, including classes A through E, where class A {virtual int a1func( );virtual void a2func( );} class D {virtual void dfunc( );} class E {virtual void efunc( );}

Class E is added as a virtual base of class C after the first release.

Referring to FIGS. 10 through 13, the procedure for constructing the VFTs for class C, D and E will be described.

Figure 11:
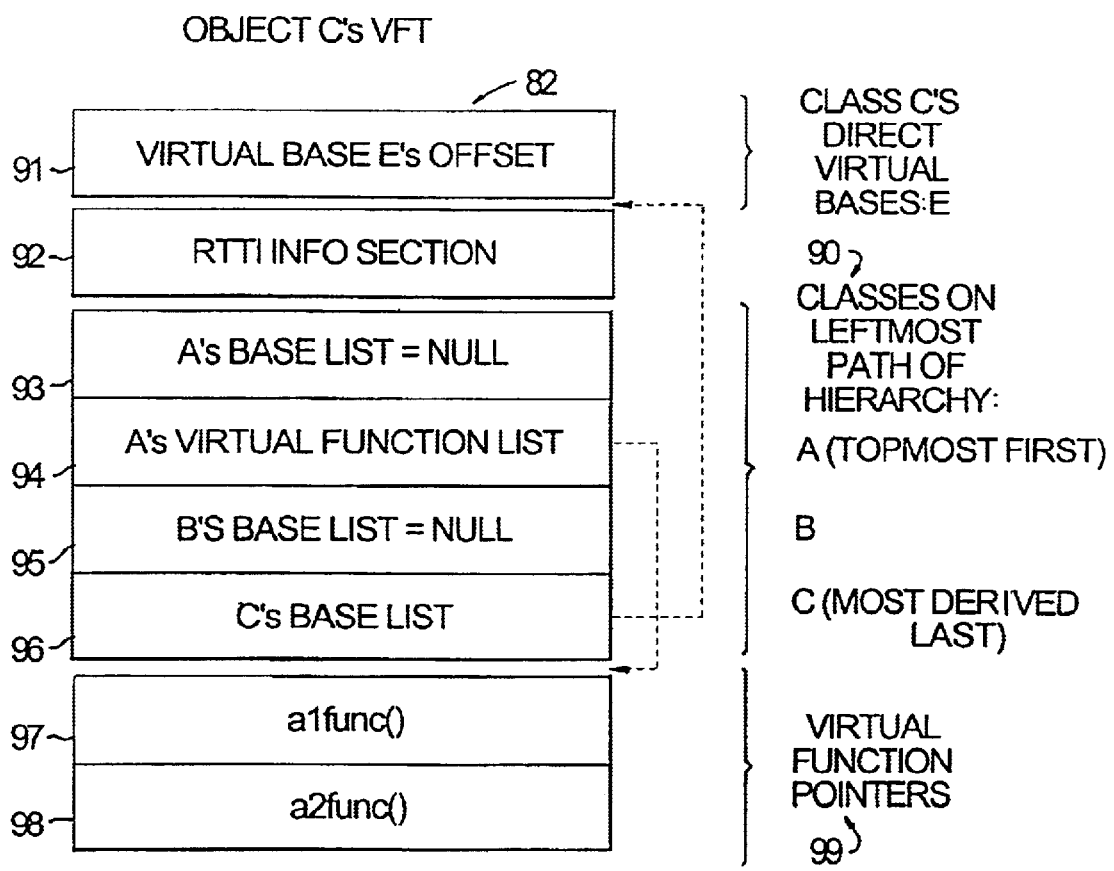
FIG. 11 illustrates the VFT layout for object C of FIG. 9.
Figure 12:
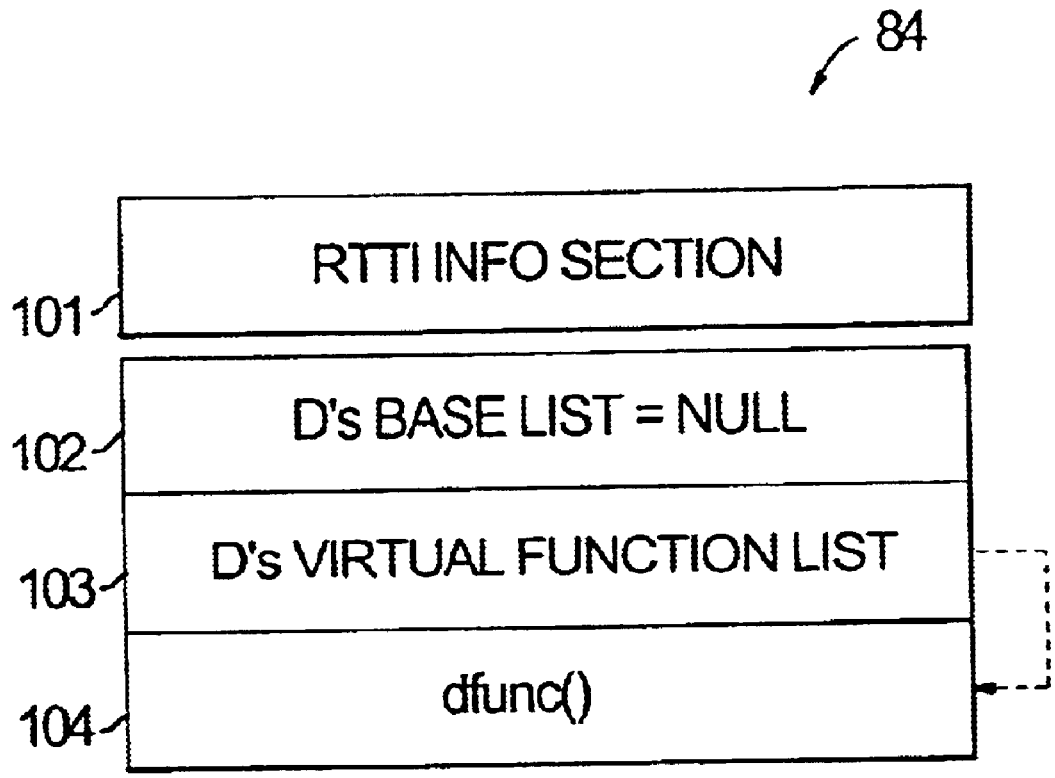
FIG. 12 illustrates the VFT layout for subobject D of FIG. 9.
Figure 13:
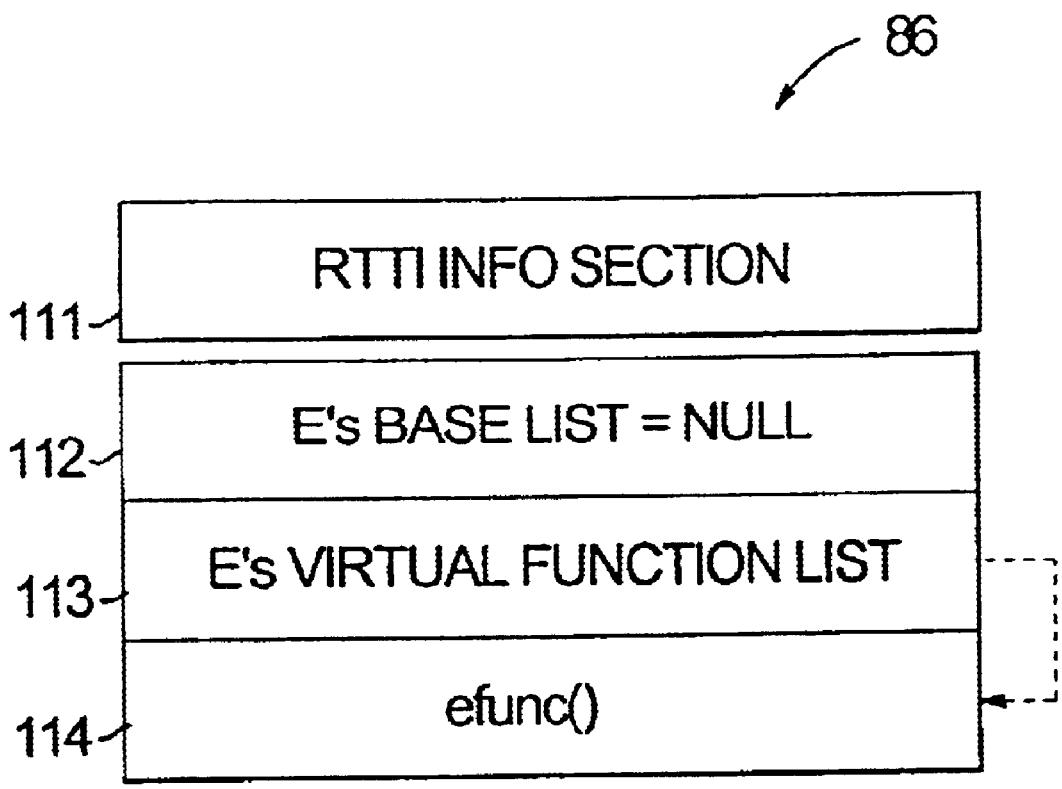
FIG. 13 illustrates the VFT layout for subobject E of FIG. 9.

FIGS. 11 through 13, set forth the VFT layouts 82, 84 and 86, respectively, for object C, subobject D and subobject E in accordance with the preferred embodiment of the invention.

In object C's VFT 82, leftmost path class section 90 contains class information 93–96 of objects A, B and C. Class A has virtual functions so it contains pointer 94 to its virtual functions list 99. Each of the three classes A, B and C has a pointer (not shown) to its direct bases. In this example, only class C has direct virtual bases so only virtual base class list 91 for C is constructed. NULL pointers 93 and 95 only are provided for classes A and B, for these may have new virtual bases in future releases.

The direct virtual base list 91 of class C contains the offset to access virtual base E.

Accessing data, virtual functions and direct virtual bases of subobject D and subobject E is done through D's VFT 84 fields 101–104 and E's VFT 86 fields 111–114, respectively.

Figure 10:
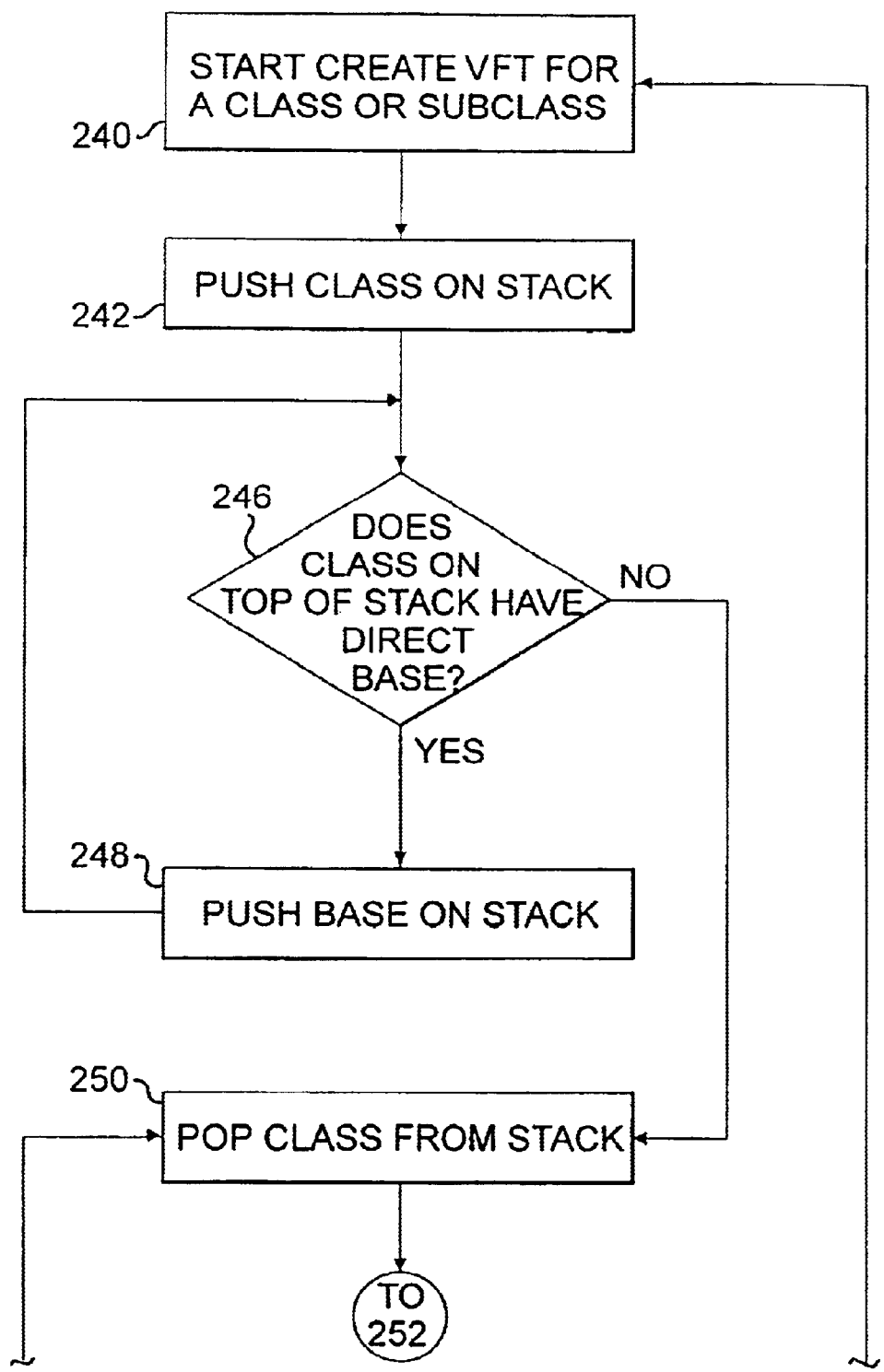
FIGS. 10A–10C form a flow diagram illustrating creation of a virtual function table (VFT) for a class or subclass in accordance with the preferred embodiment of the invention.
Figure 10:
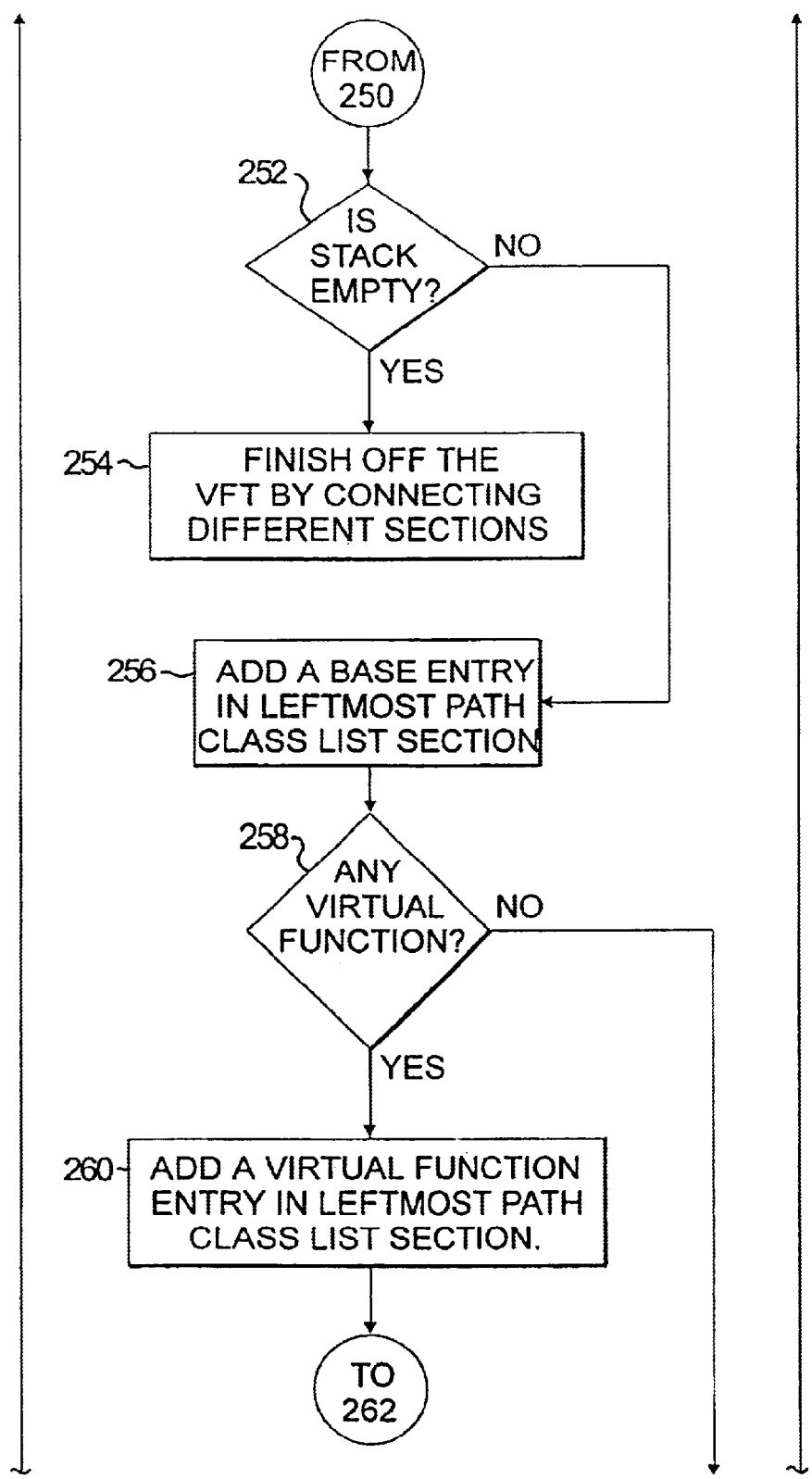
Figure 10C:
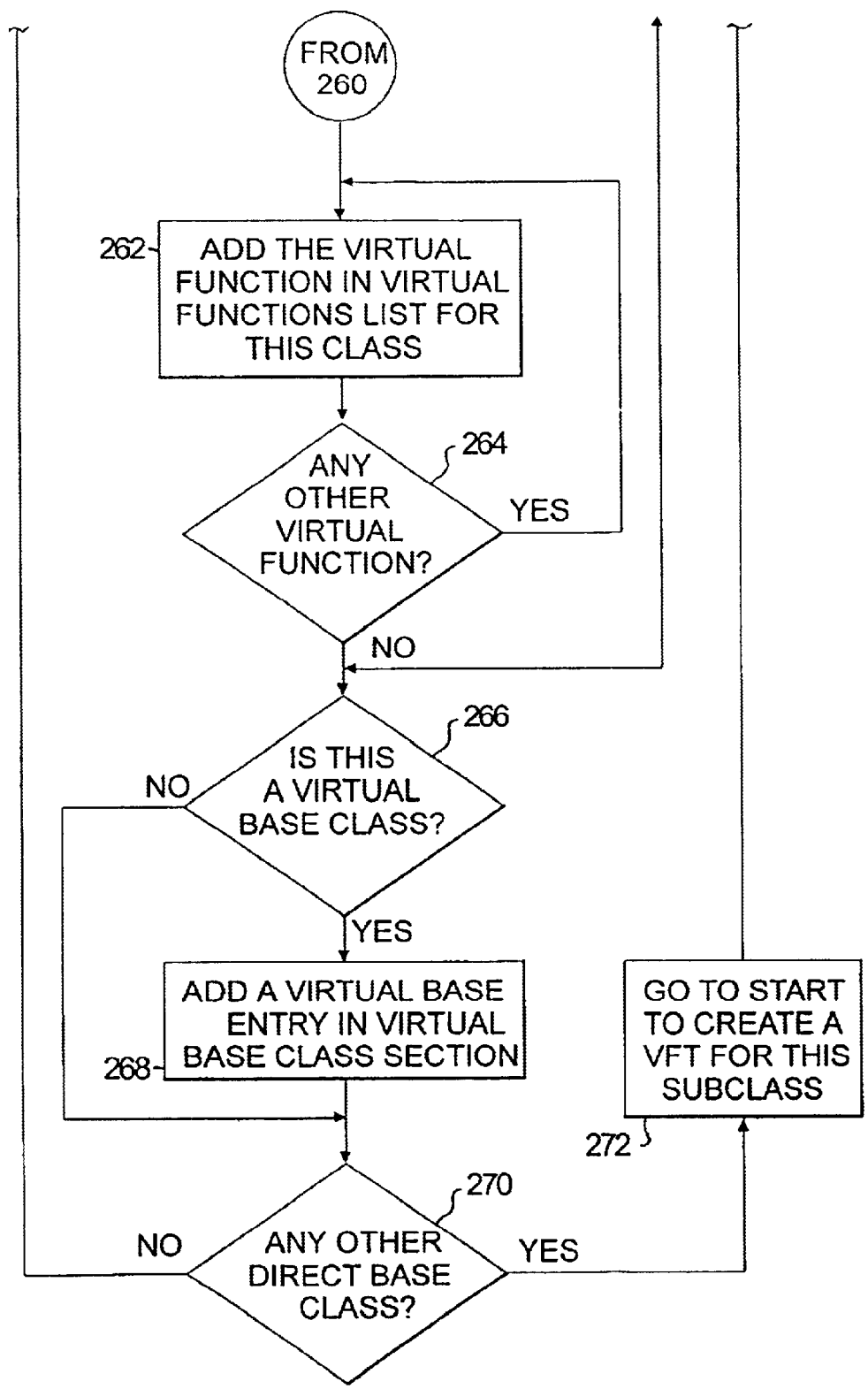

Referring to FIG. 10, in accordance with the preferred embodiment of the invention, the process 240 for constructing a virtual file table (VFT) for a class or sublcass is set forth. When constructing the VFT, the RTTI section is assumed to already exist.

Step 242 pushes this class onto a stack.

Step 246 determines if the class on top of the stack has a direct base class. If so, step 248 pushes that direct base class onto the stack, and returns to step 246. If not, step 250 pops the top class from the stack.

Step 252 determines if the stack is now empty. If so, step 254 finishes the VFT for this class by connecting the different sections (to be described hereafter). If the stack is not empty, step 256 adds a base entry in a leftmost path class list section of the VFT.

Step 258 determines if there are any virtual functions in this class. If so, step 260 adds a virtual function entry in the leftmost path class list section; and step 262 adds the virtual function in a virtual functions list for this class. Step 264 determines if there are any other virtual functions, and if so returns to step 262.

If there are no virtual functions (from steps 258 or 264), step 266 determines if this class is a virtual base class; and, if so, step 268 adds a virtual base entry in virtual base class section of the VFT.

Step 270 determines if there are any other direct base classes for this class; and if not, returns to step 250 to pop the next class from the stack. If so, step 272 goes to start 240 create a VFT for this other direct base class.

Referring now to FIG. 10 in connection with FIGS. 9 and 11–13, construction of VFTs 82, 84 and 86 for classes C, D, and E, respectively, is illustrated. Table 13 shows the construction of VFT 82, Table 14 shows the construction of VFT 84, and Table 15 shows the construction of VFT 86. Each step in the construction of the respective VFT is shown in sequential order by reference to the steps of FIG. 10.

TABLE 13

Construction of Object C VFT 82

| | | |
|---|---|---|
| 1 | 240 | START CREATE VFT FOR CLASS C |
| 2 | 242 | PUSH CLASS C ON STACK |
| 3 | 246 | CLASS C HAS DIRECT BASE CLASS B |
| 4 | 248 | PUSH CLASS B ON STACK |
| 5 | 246 | CLASS B HAS DIRECT BASE CLASS A |
| 6 | 248 | PUSH CLASS A ON STACK |
| 7 | 246 | CLASS A DOES NOT HAVE ANY DIRECT BASE |
| 8 | 250 | POP CLASS A FROM STACK . . . |
| 9 | 252 | . . . SINCE STACK IS NOT EMPTY |
| 10 | 256 | CREATE CLASS A's ENTRY 93 IN LEFTMOST CLASS LIST SECTION 90 |
| 11 | 258 | CLASS A HAS VIRTUAL FUNCTIONS |
| 12 | 260 | CREATE CLASS A's VIRTUAL FUNCTION ENTRY 94 IN LEFTMOST CLASS LIST SECTION 90 |
| 13 | 262 | ADD CLASS A's VIRTUAL FUNCTION 97 IN VIRTUAL FUNCTIONS SECTION 99 FOR CLASS A IN VFT 82 FOR CLASS A; REPEAT THIS STEP 13 FOR VIRTUAL FUNCTION 98 (UNTIL NO MORE VIRTUAL FUNCTION IS FOUND) |
| 14 | 266 | CLASS A IS NOT A VIRTUAL BASE |
| 15 | 268 | CLASS A DOES NOT HAVE ANY OTHER BASE |
| 16 | 250 | POP CLASS B AND REPEAT STEPS 9–15 FOR CLASS B, CREATING ENTRY TO FIELD 95 AT STEP 10 |
| 17 | 270 | SINCE CLASS B HAS NO OTHER BASE . . . |
| 18 | 250 | . . . POP CLASS C FROM STACK AND REPEAT STEPS 9–15 FOR CLASS C, CREATING ENTRY TO FIELD 96 AT STEP 10 |
| 19 | 270 | SINCE CLASS C HAS CLASS D AS ANOTHER BASE IN DECLARATION ORDER . . . |
| 20 | 272 | . . . GO TO START 240 TO CREATE A VFT 84 FOR CLASS D (TABLE 14) |
| 21 | 270 | POP ANOTHER CLASS FROM STACK AFTER VFT 84 OF CLASS D IS DONE |
| 22 | 252 | STACK IS EMPTY SO . . . |
| 23 | 254 | . . . FINISH OFF THE VFT 82 FOR C BY CONNECTING RTTI SECTION 92, LEFTMOST CLASS LIST SECTION 90 AND VIRTUAL FUNCTION SECTION 99 |

TABLE 14

Construction of Object D VFT 84

| | | |
|---|---|---|
| 1 | 242 | PUSH CLASS D ON STACK |
| 2 | 246 | CLASS D HAS NO DIRECT BASE |
| 3 | 250 | POP CLASS D FROM STACK |
| 4 | 256 | CREATE CLASS D's BASE LIST ENTRY 102 IN LEFTMOST CLASS LIST SECTION |
| 5 | 258 | CLASS D HAS VIRTUAL FUNCTIONS |
| 6 | 260 | CREATE CLASS D VIRTUAL FUNCTION ENTRY 103 IN LEFTMOST CLASS LIST SECTION |
| 7 | 262 | ADD CLASS D'S VIRTUAL FUNCTION 104 IN VIRTUAL FUNCTIONS SECTION FOR D AND |
| | 264 | REPEAT THIS STEP UNTIL NO MORE VIRTUAL FUNCTION FOUND |
| 8 | 266 | CLASS D IS NOT A VIRTUAL BASE |
| 9 | 270 | CLASS D DOES NOT HAVE ANY OTHER BASE |
| 10 | 250 | POP ANOTHER CLASS FROM STACK |
| 11 | 252 | STACK IS EMPTY . . . |
| | 254 | . . . SO FINISH OFF VFT 84 FOR CLASS D BY CONNECTING RTTI SECTION 101, LEFTMOST CLASS LIST SECTION 102–103, AND VIRTUAL FUNCTION SECTION 104. |

When a new base class E is added to class C, steps 1–21 are repeated. After VFT 84 of class D is created (Table 14), class E is processed in step 20 since class E is another base in declaration order after class D. Since class E is a virtual base, a virtual base entry 91 is created in step 15 for class E. This time, VFT 82 for class C is finished off in step 21 by connecting different sections together such that VFT 82 of class C will have a virtual base class section 91, RTTI section 92, leftmost class list section 90, and virtual function section 99. Since each section 91, 90 and 99 is grown separately and connected at the end, release-to-release binary compatibility (RRBC) is achieved.

TABLE 15

Construction of Object E VFT 86

| | | |
|---|---|---|
| 1 | 242 | PUSH CLASS E ON STACK |
| 2 | 246 | CLASS E HAS NO DIRECT BASE |
| 3 | 250 | POP CLASS E FROM STACK |
| 4 | 256 | CREATE CLASS E's BASE LIST ENTRY 112 IN LEFTMOST CLASS LIST SECTION |
| 5 | 258 | CLASS E HAS VIRTUAL FUNCTIONS |
| 6 | 260 | CREATE CLASS E's VIRTUAL FUNCTION ENTRY 113 IN LEFT MOST CLASS LIST SECTION |
| 7 | 262 | ADD CLASS E's VIRTUAL FUNCTION 114 IN VIRTUAL FUNCTIONS SECTION FOR CLASS E. REPEAT THIS STEP UNTIL NO MORE VIRTUAL FUNCTION IS FOUND. |
| 8 | 270 | CLASS E DOES NOT HAVE ANY OTHER BASE CLASS |
| 9 | 266 | CLASS E IS NOT A VIRTUAL BASE |
| 10 | 250 | POP ANOTHER CLASS FROM STACK |
| 11 | 252 | STACK IS EMPTY |
| 12 | 254 | FINISH VFT 86 FOR CLASS E BY CONNECTING RTTI SECTION 111, LEFTMOST CLASS LIST SECTION 112–113, AND VIRTUAL FUNCTION SECTION 114. |

It is an advantage of the preferred embodiment of the invention that there is provided an improved system and method for deriving a hierarchy without impacting RRBC.

It is an advantage of the preferred embodiment of the invention that there is provided a system and a method for further deriving a hierarchy, such as by adding new virtual base classes to the rightmost position, without impacting RRBC.

It is an advantage of the preferred embodiment of the invention that there is provided a system and method for adding new virtual base classes to the rightmost position with substantially no impact on the performance of single inheritance, non-virtual inheritance, and leftmost path inheritance.

It is an advantage of the preferred embodiment of the invention that there is provided a system and method for adding new virtual base classes without resulting in degradation of access to non-virtual bases.

Throughout this specification, reference is made to declaration order, top, bottom, right and left. These are relative terms which as used herein shall be interpreted to include their respective mirror images and rotations, as will be apparent to those skilled in the art.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise one or more general purpose computers as selectively activated or reconfigured by a computer program stored in the computer(s). The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of flow diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the description herein may refer to interactions with the user interface by way of, for example, computer mouse operation, it will be understood that within the present invention the user is provided with the ability to interact with these graphical representations by any known computer interface mechanisms, including without limitation pointing devices such as computer mouses or trackballs, joysticks, touch screen or light pen implementations or by voice recognition interaction with the computer system.

While the preferred embodiment of this invention has been described in relation to the low level assembly code and the C++ language, this invention need not be soley implemented using assembly code or the C++ language. It will be apparent to those skilled in the art that the invention may equally be implemented in other computer languages, such as object oriented languages like Java and Smalltalk. In any case, the language may be a compiled or interpreted language.

The invention may be implemented as a program storage device readable by a machine, tangibly embodying a program of instructions executable by a machine to perform the method steps of the invention or an article of manufacture comprising a computer usable medium having computer readable program code means therein, the computer readable program code means in said computer program product comprising computer readable code means for causing a computer to effect the steps of the invention. Such an article of manufacture or program storage device may include, but is not limited to, CD-ROMS, diskettes, tapes, hard drives, and computer RAM or ROM. Indeed, the article of manufacture or program storage device may be any solid or fluid transmission medium, magnetic or optical, or the like, for storing signals readable by a machine for controlling the operation of a general of special purpose programmable computer according to the method of the invention and/or to structure its components in accordance with a system of the invention.

The invention may also be implemented in a computer system. A computer system may comprise a computer that includes a processor and a memory device and optionally, a storage device, an output device such as a video display and/or an input device such as a keyboard or computer mouse. Moreover, a computer system may comprise an interconnected network of computers. Computers may equally be in stand-alone form (such as the traditional desktop personal computer) or integrated into another apparatus (such as a cellular phone).

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A method for deriving a class hierarchy, comprising the steps of:

orderig leftmost classes of said class hierarchy in top down order with a most derived class at the bottom;

ordering direct virtual classes from left to right with the leftmost class in declaration order at the top;

independently growing leftmost classes downward and direct virtual classes upward; and using a virtual file table to maintain release-to-release binary compatibility in said class hierarchy.

2. The method of claim 1, further comprising steps of:

building a the virtual file table including a virtual base class list section and a leftmost path classes information section;

said virtual base class list section storing pointers to virtual base class objects from left to right in declaration order, and an entry for a leftmost class in said leftmost path classes information section storing a pointer to the virtual base class list corresponding to said leftmost class.

3. The method of claim 2, further comprising the steps of:

building in said virtual file table a virtual functions pointers section; and said entry for a leftmost class further storing a pointer to the first virtual functions pointer in said virtual functions pointers section.

4. The method of claim 3, further comprising the step of:

building in said virtual file table a runtime section for storing runtime type identification information.

5. A method for constructing a virtual file table for a new class being added to a class hierarchy, comprising the steps of:

first pushing said new class on a stack, and if said new class has a direct base class, second pushing said direct base class on said stack; and then popping a top class from said stack;

if said stack is empty, finishing said virtual file table; otherwise, for each virtual function in said top class, first adding a virtual function entry in a leftmost path class list section of said virtual file table;

if said top class is a virtual base class, second adding a virtual base entry for said top class in a virtual base class section of said virtual file table; and whereby the virtual file table allows new classes to be added to the class hierarchy without impacting release-to-release binary compatibility.

6. The method of claim 5, comprising the further steps of:

repeating said first and second pushing, popping and first and second adding steps for each direct base class or said new class.

7. A system for constructing a class hierarchy, comprising:

mean for ordering leftmost classes of said class hierarchy in top down order with a most derived class at the bottom;

means for ordering direct virtual classes from left to right with the leftmost class in declaration order at the top; and means for independently growing leftmost classes downward and direct virtual classes upward:

means for using a virtual file table to maintain release-to-release binary compatibility in said hierarchy.

8. A virtual function table system, comprising:

a virtual base class list section for storing pointers to virtual base class objects from left to right in declaration order;

a leftmost path classes information section, an entry for a leftmost path class including a pointer to the virtual base class list corresponding to said leftmost path class; and a virtual functions pointers section, said entry for a leftmost path class further storing a pointer to a responding first virtual functions pointer in said virtual functions pointers section;

whereby said virtual function table system allows new virtual base classes to be added to a hierarchy without impacting release-to-release binary compatibility.

9. A program storage device readable by a machine, tangibly embodying a program of instructions executable by a machine to perform method steps for deriving a class hierarchy, said method steps comprising:

ordering leftmost classes of said class hierarchy in top down order with a most derived class at the bottom;

ordering direct virtual classes from left to right with the leftmost class in declaration order at the top; and independently growing leftmost classes downward and direct virtual classes upward;

using a virtual file table to maintain release-to-release binary compatibility in said hierarchy.

10. An article of manufacture comprising:

a computer useable medium having computer readable program code means embodied therein or deriving a class hierarchy, the computer readable program means in said article of manufacture comprising:

computer readable program code means for causing a computer to effect ordering leftmost classes of said class hierarchy in top down order with a most derived class at the bottom;

computer readable program code means for causing a computer to effect ordering direct virtual classes from left to right with the leftmost class in declaration order at the top; and computer readable program code means for causing a computer to effect independently growing leftmost classes downward and direct virtual classes upward;

computer readable program code means for using a virtual file table to maintain release-to-release binary compatibility in said hierarchy.

* * * * *

UNITED STATES PATENT AND TRADEMARK OFFICE
CERTIFICATE OF CORRECTION

PATENT NO. : 6,751,793 B1 Page 1 of 1
DATED : June 15, 2004
INVENTOR(S) : Catherine Y. Lung et al.

It is certified that error appears in the above-identified patent and that said Letters Patent is hereby corrected as shown below:

Column 18,
Line 38, after "building" delete "a"
Line 38, after "table" insert -- , --
Line 43, "order," should read -- order; --

Column 19,
Line 9, "or" should read -- for --
Line 12, "mean" should read -- means --
Line 20, "upward:" should read -- upward; --
Line 34, "responding" should read -- corresponding --

Column 20,
Line 18, "or" should read -- for --

Signed and Sealed this

Twenty-eighth Day of December, 2004

JON W. DUDAS
*Director of the United States Patent and Trademark Office*